(12) United States Patent
Wilson et al.

(10) Patent No.: US 9,231,808 B1
(45) Date of Patent: Jan. 5, 2016

(54) SYSTEMS AND METHODS FOR COMPENSATING FOR IMPULSE NOISE

(75) Inventors: Arlynn Wayne Wilson, Huntsville, AL (US); Richard Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 368 days.

(21) Appl. No.: 13/164,810

(22) Filed: Jun. 21, 2011

(51) Int. Cl.
*H04B 1/00* (2006.01)
*H04L 27/26* (2006.01)
*H04B 1/10* (2006.01)
*H04B 3/30* (2006.01)
*H04L 25/08* (2006.01)
*H04L 25/03* (2006.01)

(52) U.S. Cl.
CPC ............. *H04L 27/2647* (2013.01); *H04B 1/10* (2013.01); *H04B 3/30* (2013.01); *H04L 25/03006* (2013.01); *H04L 25/085* (2013.01)

(58) Field of Classification Search
CPC .......... H04B 3/332; H04B 15/00; H04B 3/30; H04L 25/085; H04L 27/2691; H04L 25/0276; H04L 25/03885; H04M 3/18; H04M 13/373
USPC ................. 375/340, 346, 351, 347, 349, 350; 370/201; 379/416; 455/223, 295, 63.1, 455/67.13
See application file for complete search history.

(56) References Cited

U.S. PATENT DOCUMENTS

| | | | |
|---|---|---|---|
| 5,852,477 A * | 12/1998 | Limberg ........................ 348/725 |
| 5,926,489 A * | 7/1999 | Luthi et al. .................... 375/346 |
| 6,052,420 A * | 4/2000 | Yeap ...................... H04B 15/00 375/258 |
| 6,470,059 B2 * | 10/2002 | Starr ............................. 375/350 |
| 6,721,373 B1 * | 4/2004 | Frenkel ................. H04L 1/0045 375/346 |
| 6,940,973 B1 * | 9/2005 | Yeap et al. ..................... 379/416 |
| 6,959,056 B2 * | 10/2005 | Yeap .................. G10L 21/0208 375/346 |
| 7,248,890 B1 * | 7/2007 | Raghavan et al. ............ 455/522 |
| 7,315,592 B2 * | 1/2008 | Tsatsanis .................. H04B 3/32 370/201 |
| 7,443,916 B2 | 10/2008 | Sedarat et al. |
| 7,593,494 B1 * | 9/2009 | Ghobrial ................... H04B 3/30 375/347 |
| 7,809,076 B1 * | 10/2010 | Ghobrial ........... H04L 25/03885 375/265 |
| 7,813,439 B2 * | 10/2010 | Norrell ............. H04L 25/03159 375/265 |
| 7,912,156 B1 * | 3/2011 | Hall .................. H03M 13/2906 375/278 |
| 8,233,572 B2 * | 7/2012 | Julian et al. ................... 375/346 |
| 8,325,828 B1 * | 12/2012 | Liu ..................... H04L 27/2647 375/259 |
| 8,457,219 B2 * | 6/2013 | Pons ................. H03M 13/1102 370/331 |
| 8,498,217 B2 * | 7/2013 | Kota ..................... H04B 15/00 370/252 |
| 8,605,837 B2 * | 12/2013 | Wiese et al. .................. 375/346 |

(Continued)

OTHER PUBLICATIONS

Goodson, et al., U.S. Appl. No. 11/501,420 entitled, "Systems and Methods for Compensating for Repetitive Impulse Noise", filed Aug. 9, 2006.

*Primary Examiner* — Sophia Vlahos
(74) *Attorney, Agent, or Firm* — Maynard Cooper & Gale, P.C.; Jon E. Holland

(57) ABSTRACT

Embodiments of the present disclosure generally pertain to systems and methods for compensating for impulse noise. A system in accordance with an exemplary embodiment of the present disclosure comprises a receiver coupled to a subscriber line. The receiver is configured to receive an encoded data signal via the subscriber line and separate the signal into a common mode (CM) signal and a differential mode (DM) signal. The receiver is further configured to detect impulse noise on the CM signal and mark corresponding sub-words of the DM signal affected by the detected impulse noise as erasures. The receiver then decodes the DM signal based on whether the sub-words are marked as erasures.

15 Claims, 8 Drawing Sheets

(56) References Cited

U.S. PATENT DOCUMENTS

| | | | |
|---|---|---|---|
| 8,638,809 B1* | 1/2014 | Goodson | H04L 1/20 370/441 |
| 2006/0078044 A1 | 4/2006 | Norrell et al. | |
| 2006/0083324 A1 | 4/2006 | DesJardins et al. | |
| 2007/0157065 A1* | 7/2007 | Pons et al. | 714/758 |
| 2009/0052541 A1* | 2/2009 | Kang et al. | 375/240.24 |
| 2009/0216489 A1* | 8/2009 | Mahadevan et al. | 702/181 |
| 2010/0091827 A1* | 4/2010 | Wiese | H04B 1/10 375/225 |

* cited by examiner

SYSTEMS AND METHODS FOR COMPENSATING FOR IMPULSE NOISE

RELATED ART

Noise on a subscriber line corrupts signal quality and limits the overall speed at which data can be successfully communicated. One type of noise, referred to as "impulse noise," is characterized by high amplitude levels of short duration. Due to the high amplitude levels associated with impulse noise, data bits corrupted by a burst of impulse noise cannot normally be recovered merely using common filtering techniques.

There are several techniques for dealing with impulse noise, including frame blanking, increasing the amount of forward error correction (FEC) parity relative to the FEC codeword size, retransmission of affected frames, and use of common mode (CM) signals to adaptively cancel impulse noise from a differential mode (DM) signal. For the last approach, a received signal is separated into its DM component and its CM component. When impulse noise is detected in the CM signal, the impulse noise is filtered in the CM signal in an attempt to form an estimate of the corresponding impulse noise in the DM signal. The estimate is then subtracted from the DM signal in an effort to cancel the impulse noise from such signal.

However, there are several drawbacks to such approach. In particular, the addition of the CM content to the received DM signal can increase the overall noise in the DM signal, even though it decreases the impulse noise. Also, it can be difficult to learn the proper coefficients for filtering the CM signal. Accordingly, improved techniques for compensating for impulse noise are generally desirable.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for compensating for impulse noise. A system in accordance with an exemplary embodiment of the present disclosure comprises a receiver coupled to a subscriber line. The receiver is configured to receive an encoded data signal and separate the signal into a common mode (CM) signal and a differential mode (DM) signal. The receiver is further configured to detect impulse noise in the CM signal and mark corresponding sub-words of the DM signal affected by the detected impulse noise event as erasures. The receiver then decodes the DM signal based on whether the sub-words are marked as erasures. By marking as erasures sub-words that have been corrupted by impulse noise, the decoder is able to correct a larger number of transmission errors helping to mitigate the effects of the detected impulse noise event.

Figure 1:
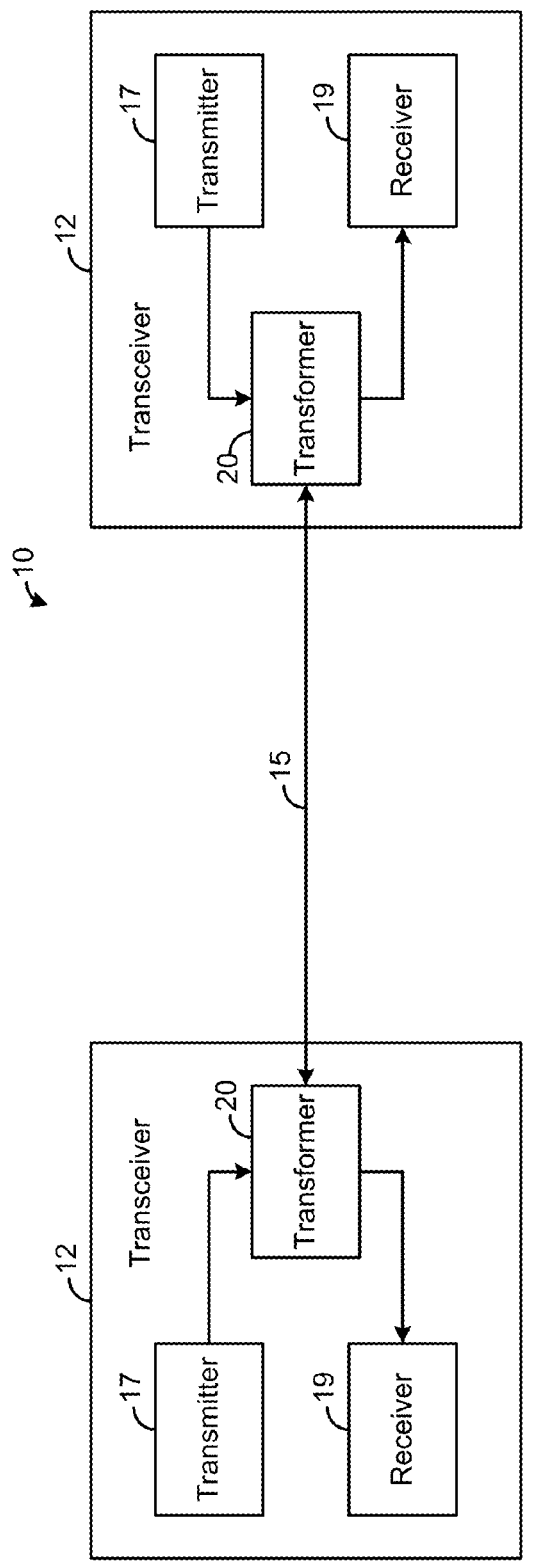
FIG. 1 is a block diagram depicting an exemplary embodiment of a communication system.

FIG. 1 depicts a communication system 10 in accordance with an exemplary embodiment of the present disclosure. The system 10 comprises a pair of transceivers 12 that communicate with one another via a subscriber line 15. As a mere example, one of the transceivers 12 may be located at a central office of a telecommunication network or at some intermediate point between the central office and a customer premises, and the other transceiver 12 may reside at the customer premises that is serviced by the central office. The transceivers 12 may be located at other locations within a telecommunication network in other embodiments. In one embodiment, the subscriber line 15 comprises a pair of conductive connections, such as a pair of twisted copper connections sometimes referred to as a "twisted-wire pair," but other types of connections are possible in other embodiments.

Each of the transceivers 12 comprises a transmitter 17 for transmitting encoded data signals across the subscriber line 15 and a receiver 19 for receiving such data signals. As an example, each of the transceivers 12 may be implemented as an xDSL (x-digital subscriber line) transceiver, such as asymmetric DSL (ADSL), very-high-data-rate DSL (VDSL), high-data-rate DSL (HDSL), HDSL2, symmetric DSL (SDSL), single-pair high-speed DSL (SHDSL), etc., although other types of transceivers are possible in other embodiments. As shown by FIG. 1, each of the transceivers 12 comprises a transformer 20 that couples its transmitter 17 and receiver 19 to the subscriber line 15.

Figure 2:
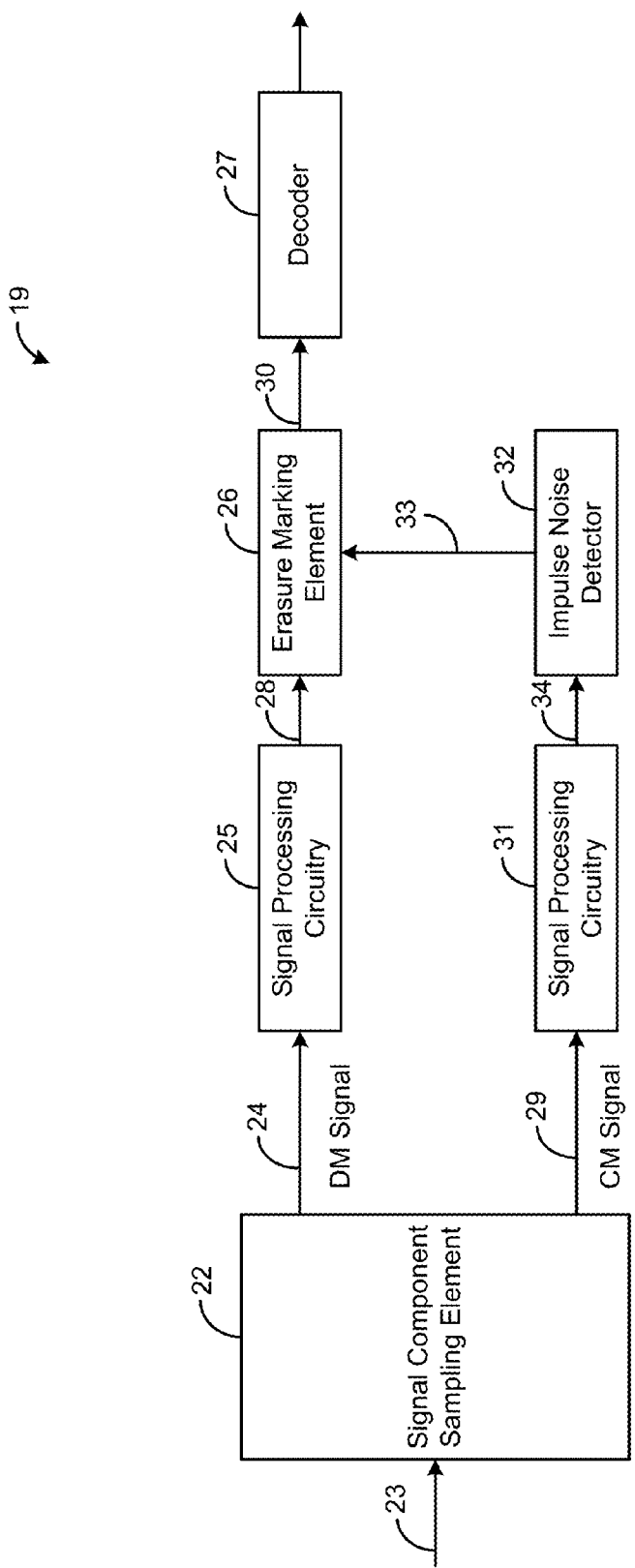
FIG. 2 is a block diagram depicting an exemplary embodiment of a receiver, such as is depicted by FIG. 1.

FIG. 2 depicts an exemplary embodiment of a receiver 19. As shown by FIG. 2, the receiver 19 comprises a signal component sampling element 22 that receives an encoded data signal 23 from the subscriber line 15 (FIG. 1). The signal component sampling element 22 separately outputs a DM signal 24 and a CM signal 29 of the received signal 23. The sampling element 22 may comprises transformers or other components for separating the encoded data signal 23 into the DM signal 24 and the CM signal 29. Exemplary techniques for separating a received signal into a differential mode component and a common mode component are described in U.S. Pat. No. 7,315,592, entitled "Common Mode Noise Cancellation," and issued on Jan. 1, 2008, which is incorporated herein by reference.

The DM signal 24 travels along a DM path and the CM signal 29 travels along a CM path, with the DM path extending between the signal component sampling element 22 and an erasure marking element 26 and the CM path extending between the component sampling element 22 and an impulse noise detector 32. Note that when the data signal 23 contains a noise impulse, the noise impulse appears in both the DM signal 24 and the CM signal 29.

The DM path of the receiver 19 comprises signal processing circuitry 25, which receives the DM signal 24 and processes the signal 24 depending on various factors, such as signal type (e.g. modulation format). The circuitry 25 is configured to perform signal processing functions, such as analog-to-digital (A/D) conversion, filtering, equalization and/or other signal processing techniques on the DM signal 24 to provide a processed DM signal 28 that is received by the erasure marking element 26. As will be described in more detail hereafter, sub-words of the processed DM signal 28 are marked as erasures as appropriate by the erasure marking element 26 to provide a processed DM signal 30 in which sub-words affected by impulse noise are marked as erasures. A decoder 27 then decodes the processed DM signal 30 based on the erasure marking performed by the erasure marking element 26. For example, in one embodiment, the data signal 23 has been encoded with parity information, and the decoder 27 is configured to use such information to correct for transmission errors in the received signal 23 based on the erasure marking.

In this regard, before transmitting data to the receiver 19, the transmitter 17 at the opposite end of the subscriber line 15 is configured to encode the data using a known or future-developed FEC algorithm, such as, for example, Reed-Solomon coding. In FEC, each code word includes payload data that is to be communicated to the receiver 19 as well as parity information, which is redundant information about the payload data for enabling a decoder of the receiver 19 to recover various bits of payload data that have been corrupted during transmission. Furthermore, each code word comprises one or more sub-words, which can include any number of bits. For example, a sub-word may be a unit of data commonly referred to as an "octet," which has eight bits of data, but it is possible for a sub-word to have other numbers of bits in other examples. Moreover, the payload data and the parity information of each code word are transmitted as one or more sub-words, and it is possible for any of the sub-words to include both payload and parity information. In addition, it is possible for algorithms other than FEC to be used to define parity information and to correct errors in the received data signal 23.

The CM path of the receiver 19 comprises signal processing circuitry 31, which receives the CM signal 29 from the signal component sampling element 22 and processes the signal 29 depending on various factors, such as signal type. Like the circuitry 25 of the DM path, the circuitry 31 of the CM path is configured to perform signal processing functions, such as A/D conversion, filtering, equalization and/or other signal processing techniques to provide a processed DM signal 34 that is received by the impulse noise detector 32. In one embodiment, the circuitry 31 of the CM path is configured similarly to the circuitry 25 of the DM path such that it performs the same functions as the circuitry 25 and delays the CM signal by the same amount as the circuitry 25 delays the DM signal. Such timing facilitates marking the DM signal 28 with erasures based on detected impulse noise, as will be discussed in more detail hereafter.

The CM path further comprises the impulse noise detector 32. The impulse noise detector 32 is configured to receive the CM signal 34 from the signal processing circuitry 31 and determine when the CM signal 34 is affected by impulse noise. In one embodiment, the impulse noise detector 32 compares the voltage of the CM signal 34 to a threshold, which is set at a level such that, if it is exceeded, impulse noise is likely. Thus, the impulse noise detector 32 detects the presence of impulse noise when the threshold is exceeded and provides an impulse indication signal 33 indicating when impulse noise is detected in the CM signal 34. Note that the threshold may be set to a predefined value or may be adaptively established based on a processed version of the data signal 23 received by the receiver 19. As an example, the impulse noise detector 32 may be configured adaptively set and update the threshold based on the processed CM signal 34, as will be described in more detail hereafter. Based on the impulse indication signal 33, the erasure marking element 26 determines which sub-words of the DM signal 28 are affected by impulse noise and marks such sub-words as erasures, which will be described in more detail below.

In one embodiment, the delay of the signal processing circuitry 25 of the DM path is substantially equal to the delay of the signal processing circuitry 31 of the CM path such that the erasure marking element 26 receives a sub-word of the DM signal 28 at about the same time the impulse noise detector 32 receives a corresponding indication for that same sub-word in the CM signal 34. Moreover, by controlling the timing of the CM and DM paths in such manner, the state of the impulse indication signal 33 from the impulse noise detector 32 indicates whether the sub-word being received by the erasure marking element 26 in the DM path is affected by impulse noise. In this regard, if the impulse noise detector 32 detects impulse noise in the CM signal 34, then it can be assumed that the corresponding sub-word in the DM signal 28 is affected by the same impulse noise event that caused impulse noise in the CM signal 34. Accordingly, by indicating when impulse noise is detected in the CM path, the impulse indication signal 33 effectively indicates when the sub-word being processed by the erasure marking element 26 is corrupted by impulse noise.

Note that there are various techniques that can be used to mark a sub-word as an erasure. As an example, the erasure marking element 26 may be configured to append an indicator, referred to herein as an "erasure flag," to each sub-word. Such erasure flag may be a one bit indicator, although other numbers of bits are also possible. If asserted, the erasure flag indicates that the sub-word to which it is appended is marked as an erasure. If deasserted, the erasure flag indicates such sub-word is not marked as an erasure. In an alternative embodiment, rather than appending an erasure flag to each sub-word, the erasure flag may be transmitted as a separate signal to the decoder 27. Exemplary techniques for marking sub-words as erasures are further described in commonly-assigned U.S. patent application Ser. No. 11/501,420, entitled "Systems and Methods for Compensating for Repetitive Impulse Noise," and filed on Aug. 9, 2006, which is incorporated herein by reference.

The decoder 27 is configured to receive the code words of the DM signal 30 from the erasure marking element 26 and to decode such code words thereby recovering the data originally encoded by the transmitter 17 at the opposite end of the subscriber line 15. In decoding each code word, the decoder 27 is configured to use the parity information in the code word to correct transmission errors based on the erasure marking performed by the erasure marking element 26. In particular, the decoder 27 assumes that a sub-word marked as an erasure is an error location, thereby enabling the decoder 27 to correct more errors than would be possible without erasure marking.

In this regard, in decoding code words having errors, a decoder typically uses the parity information to both find errors and correct the located errors. If the location of the errors can be discovered and marked prior to decoding, then the decoder can correct for a larger number of errors since the parity information does not need to be used to discover the error locations. In general, a decoder can correct for twice the number of errors for a given amount of parity information when it does not have to use the parity information to discover the location of the errors. Accordingly, by marking sub-words corrupted by impulse noise as erasures, the erasure marking element 26 enables the decoder 27 to correct for a larger number of errors.

An exemplary use and operation of the receiver 19 depicted by FIG. 2 will now be described below with particular reference to FIGS. 3 and 6.

The signal component sampling element 22 receives the data signal 23 from the subscriber line 15 and separates the data signal 23 into its differential mode component and its common mode component thereby providing the differential mode signal 24 and the common mode signal 29, which are respectively processed by signal processing circuitry 25 and 31. The signal processing circuitry 25 and 31 perform various processing on the signals 24 and 29, respectively, including converting such signals 24 and 29 from analog to digital.

Figure 3:
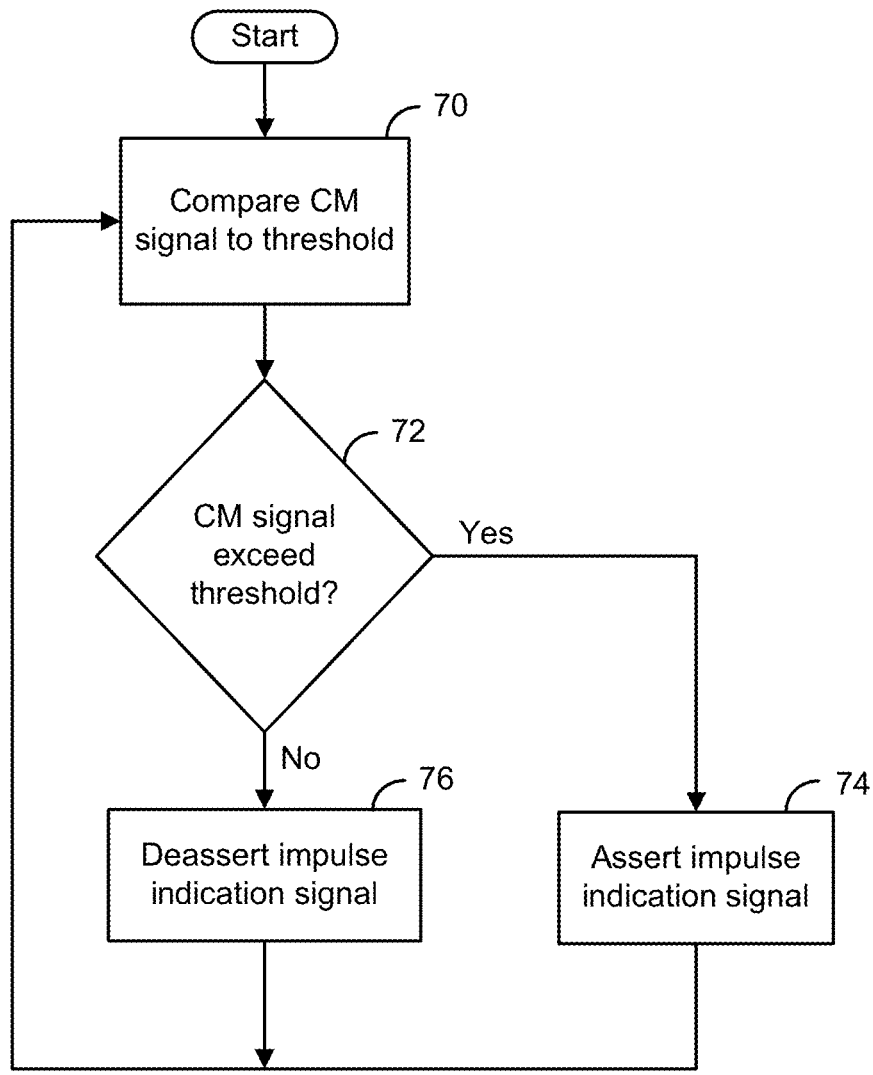
FIG. 3 is a flowchart illustrating an exemplary method for detecting impulse noise in a CM signal.

The impulse noise detector 32 compares digital samples of the processed CM signal 34 to a threshold, as shown by block 70 of FIG. 3, in order to determine whether impulse noise is present in such signal 34. In a discrete multi-tone (DMT) implementation, the threshold comparison could be performed on the individual frequencies following an FFT function or on a summation of power over many frequencies. If the threshold is exceeded, the impulse noise detector 32 detects impulse noise and hence asserts the impulse indication signal 33, as shown by blocks 72 and 74 of FIG. 3, thereby indicating that the corresponding portion of the DM signal 28 is affected by impulse noise. If the threshold is not exceeded, the impulse noise detector 32 does not detect impulse noise and hence deasserts the impulse indication signal 33, as shown by block 76, thereby indicating that the corresponding portion of the DM signal 28 is not affected by impulse noise. In DMT embodiments, the indication may be on a per frequency tone basis or on a per DMT symbol basis.

Figure 4:
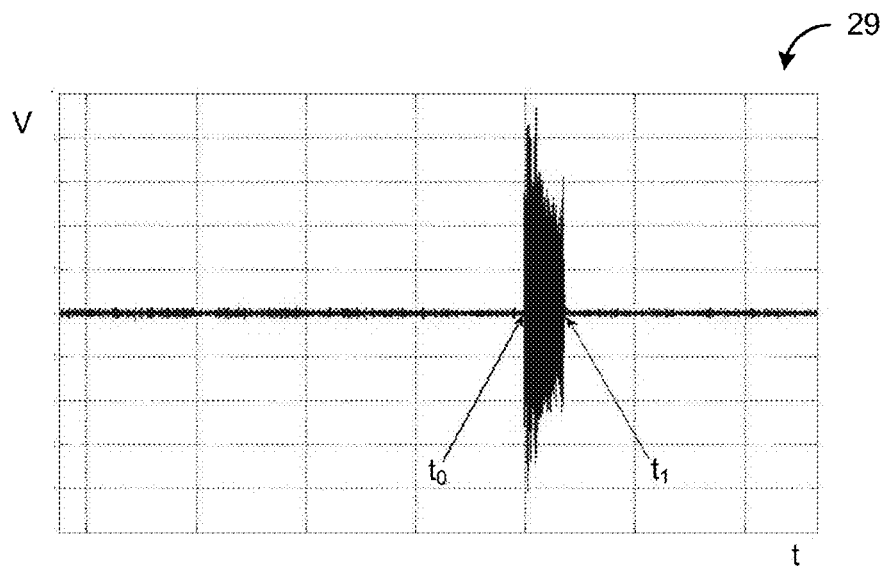
FIG. 4 is a graph depicting an occurrence of impulse noise in a data signal.

To better illustrate the foregoing, assume that an impulse noise event occurs between times $t_0$ and $t_1$ corrupting the signal 23 propagating across the subscriber line 15. FIG. 4 shows an exemplary graph of voltage (V) versus time (t) for the signal 23. As shown by FIG. 4, the signal's amplitude is significantly increased between $t_0$ and $t_1$ due to the occurrence of impulse noise.

Figure 5:
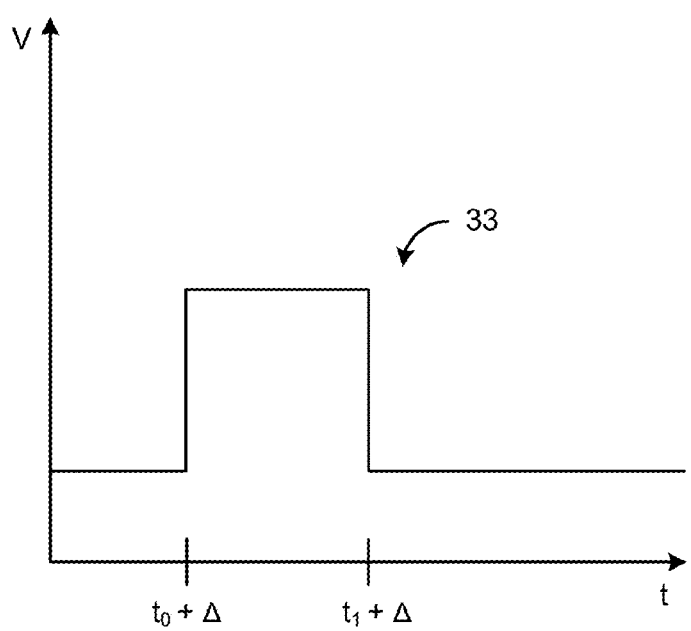
FIG. 5 is a graph depicting an impulse indication signal from an impulse noise detector, such as is depicted by FIG. 2.

FIG. 5 depicts an exemplary graph of voltage (V) versus time (t) for the impulse indication signal 33 output by the impulse noise detector 32. After a delay ($\Delta$), equal to the amount of time for the signal 23 to be received and processed by the signal component sampling element 22 and the signal processing circuitry 31, the impulse noise detector 32 begins to detect the impulse noise event and, thus, asserts the impulse indication signal 33. The signal 33 remains asserted for the duration of the detected event, equal to $t_1$-$t_0$. While the signal 33 is asserted, the erasure marking element 26 receives the sub-words affected by the detected impulse noise event. In this regard, as noted above, the delay of the DM path substantially equals the delay of the CM path such that the sub-words affected by the impulse noise event are received and marked as erasures by the erasure marking element 26 while the impulse indication signal 33 is asserted. If the modulation is DMT-based, the time domain samples shown in FIG. 4 would be processed through an FFT function, and the impulse CM signal 29 would comprise numerous frequency bins. Each one of these frequency bins could then be compared to a respective threshold to determine if that frequency is likely to have been corrupted by the impulse.

Figure 6:
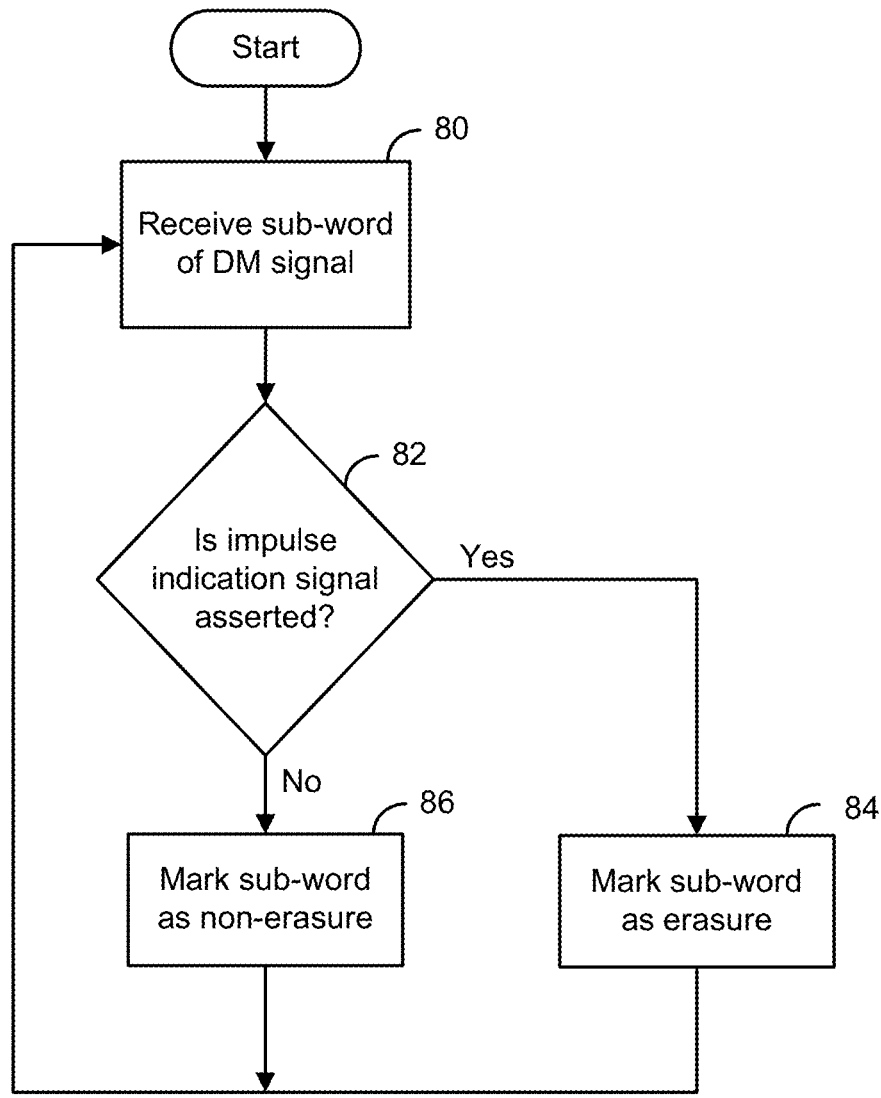
FIG. 6 is a flowchart illustrating an exemplary method for compensating for impulse noise in a DM signal.

For a given sub-word of the DM signal 28, the erasure marking element 26 analyzes the impulse indication signal 33 being simultaneously received from the impulse noise detector 32 in order to determine whether to mark the sub-word as an erasure, as shown by blocks 80 and 82 of FIG. 6. If the impulse indication signal 33 is asserted, the erasure marking element 26 marks the sub-word of the DM signal 24 as an erasure, as shown by block 84. If the impulse indication signal 33 is deasserted, the erasure marking element 26 marks the sub-word of the DM signal 24 as a non-erasure, as shown by block 86. Accordingly, each sub-word of the DM signal 24 affected by detected impulse noise is identified and marked as an erasure.

In the foregoing example, in which a noise impulse occurs between times $t_0$ and $t_1$, the sub-words of the DM signal 28 affected by such impulse noise event are received by the erasure marking element 26 between the times $t_0+\Delta$ and $t_1+\Delta$, which is the same time period that the impulse indication signal 33 is asserted. Thus, each such sub-word is marked as an erasure according to the flowchart depicted by FIG. 6.

Figure 7:
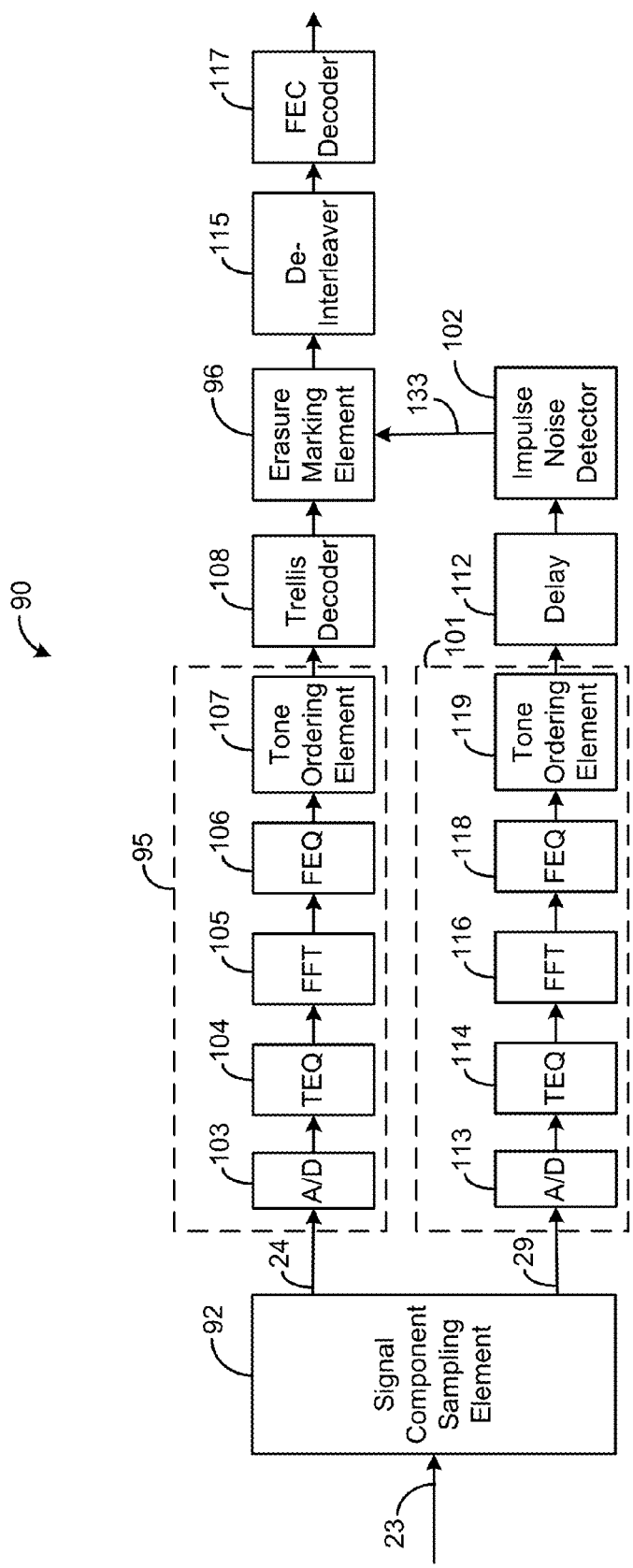
FIG. 7 is a block diagram depicting an exemplary embodiment of a receiver for a discrete multi-tone modulation (DMT) system.

FIG. 7 depicts an exemplary embodiment of a receiver 90 for a discrete multi-tone modulation (DMT) system. As an example, the receiver 90 depicted by FIG. 7 may be implemented as an ADSL or VDSL receiver. The receiver 90 comprises a signal component sampling element 92, signal processing circuitry 95, an erasure marking element 96, signal processing circuitry 101, and an impulse noise detector 102. Note that the signal component sampling element 92, the erasure marking element 96, and the impulse noise detector 102 are configured identically to and operate the same as the signal component sampling element 22, the erasure marking element 26, and the impulse noise detector 32 of FIG. 2, respectively.

The signal component sampling element 92 is configured to receive the data signal 23 and provide the DM signal 24 and the CM signal 29, as set forth above with respect to the signal component sampling element 22 of FIG. 2. The DM signal 24 is processed by signal processing circuitry 95. The circuitry 95 comprises an A/D converter 103, a time domain equalizer (TEQ) 104, a fast Fourier transform (FFT) 105, a frequency domain equalizer (FEQ) 106, a tone ordering element 107, and a trellis decoder 108. The A/D converter 103 is configured to convert the DM signal 24 from analog to digital for processing by other components of the circuitry 95. The time domain equalizer (TEQ) 104 is configured to equalize a time domain representation of the digital DM signal. The fast Fourier transform (FFT) 105 is configured to compute a discrete Fourier transform of the equalized DM signal and to transform such signal from a time domain representation to a frequency domain representation. The frequency domain equalizer (FEQ) 106 is configured to operate on the frequency domain representation of the DM signal and equalize such signal by correcting the amplitude and phase of one or more tones. The tone ordering element 107 is configured to receive the output of the FFT 105 as a vector of frequency tones, reorder the elements of the vector, and convert the parallel stream of data in the received signal into a stream of serial tones.

The trellis decoder 108 is configured to perform trellis decoding on the output of the circuitry 95. In this regard, the transmitter 17 (FIG. 1) at the opposite end of the subscriber line 15 encodes the data signal 23 via trellis coded modulation prior to transmitting the signal 23 via the subscriber line 15. Thus, the trellis decoder 108 decodes the DM signal from the tone ordering element 107 using trellis coded modulation techniques and transmits the decoded DM signal as FEC sub-words to the erasure marking element 96.

In such an embodiment, the trellis decoder 108 outputs a stream of FEC sub-words, and each such FEC sub-word corresponds to a particular tone of the DMT signal received by the receiver 90. In such an embodiment, each sub-word may be an entire FEC code word, which corresponds to one of the tones of the DMT signal, or a portion (e.g., one or more octets) of an FEC code word. Note that erasure marking may be performed bit-by-bit such that a sub-word constitutes a single bit of information, although any number of bits may be associated with the same erasure marking.

The signal processing circuitry 101, like the signal processing circuitry 95, comprises an A/D converter 113, a time domain equalizer 114, a fast Fourier transform 116, a frequency domain equalizer 118, and a tone ordering element 119. However, the signal processing circuitry 101 further comprises a delay element 112 for introducing a delay equal to that of the trellis decoder 108 so that the total delay of the DM path up to the erasure marking element 96 is the same as that for the CM path up to the impulse noise detector 102, noting that such CM path lacks a trellis decoder 108.

The impulse noise detector 102, as set forth above with respect to the impulse noise detector 32 of FIG. 2, is configured to receive a processed CM signal from the circuitry 101 and compare such signal to at least one threshold. If the processed CM signal exceeds the threshold, the detector 32 detects impulse noise and asserts an impulse indication signal 133, as described above for the impulse noise detector 32 of FIG. 2. Based on the impulse indication signal 133, the erasure marking element 96 is configured to mark as erasures sub-words of the DM signal for which impulse noise has been detected, as described above for the erasure marking element 26 of FIG. 2.

Further, if desired, the impulse noise detector 102 may be configured to use different thresholds for different frequencies. As an example, when the erasure marking element 96 is receiving a sub-word corresponding to a first tone of a DMT symbol, the impulse noise detector 102 may be configured to compare a first threshold to a portion of the CM signal corresponding to the first tone and output the impulse indication signal according to such comparison. However, when the erasure marking element 96 is receiving a sub-word corresponding to a second tone of the DMT symbol, the impulse noise detector 102 may be configured to compare a second threshold to a portion of the CM signal corresponding to the second tone and output the impulse indication signal according to such comparison.

The receiver 90 further comprises a de-interleaver 115. The de-interleaver 115 is configured to de-interleave the code words of the DM signal output by the erasure marking element 96. In this regard, in an effort to mitigate for impulse noise, the code words transmitted along the subscriber line 15 (FIG. 1) may be interleaved so that the effects of an impulse noise occurrence is spread out over a larger number of code words thereby reducing the number of errors caused by the impulse noise occurrence in each affected code word. If the number of errors in each code word is kept small enough, the parity information included in the code word may be sufficient to correct for the errors. Thus, interleaving increases the system's robustness to withstand an occurrence of impulse noise. Exemplary interleaving techniques are described in commonly-assigned U.S. patent application Ser. No. 10/626,022, entitled "System and Method for Interleaving and Transmitting Forward Error Correction Code Words," and filed on Jul. 24, 2003, which is incorporated herein by reference. The de-interleaving is configured to rearrange the data received from the erasure marking element 96 in order to recover the code words originally interleaved by the transmitter 17 at the opposite end of the subscriber line 15.

The de-interleaver 115 transmits the reconstructed code words to the FEC decoder 117. The FEC decoder 117, such as, for example, a Reed-Solomon decoder, is configured to decode the DM signal 24 based on the erasure markings provided by the erasure marking element 96. Thus, the decoder 117 is able to correct for more errors than would otherwise be possible without the erasure marking information provided by the erasure marking element 96.

Figure 8:
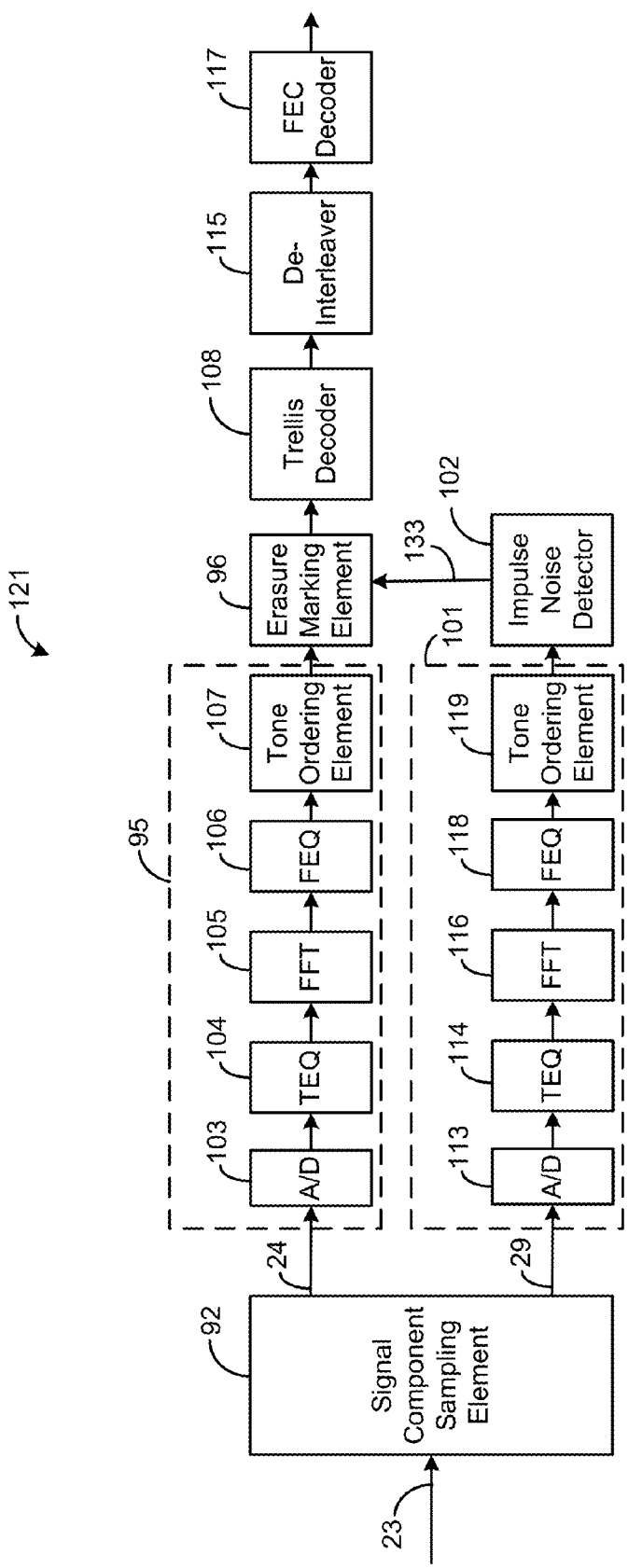
FIG. 8 is a block diagram depicting an exemplary embodiment of a receiver for a DMT system.

FIG. 8 depicts another exemplary embodiment of a DMT receiver 121 for a discrete multi-tone modulation (DMT) system. The DMT receiver 121 of FIG. 8 is the same as the DMT receiver 90 of FIG. 7 except that the erasure marking occurs prior to the trellis decoder 108. In the exemplary embodiment shown by FIG. 8, the trellis decoder 108 receives a stream of frequency tones, and the data of each such tone defines a constellation value, which could constitute a sub-word that is marked as an erasure when the tone is determined to be affected by impulse noise. Further, as described above, different thresholds could be used for different tones such that the threshold used by the impulse noise detector 102 for one tone may be different than the threshold used for another tone.

In addition, it is possible for the power or amplitude of a plurality of tones to be summed such that a group of tones are marked as an erasure in response to a comparison of the summed power to a threshold. As a mere example, the power of all of the tones of a DMT symbol may be summed by the impulse noise detector 102, and the summed power may be compared to a threshold. If the threshold is exceeded, the erasure marking element 96 is configured to mark all such tones as erasures. In such case, the erasure marking is performed on a per DMT symbol basis, and a sub-word in such an example constitutes a DMT symbol rather than the tone of a DMT symbol as is described above. Other techniques for marking sub-words as erasures are possible in other embodiments.

In yet other embodiments, the erasure marking may be performed prior to the tone ordering element 107. For example, if the erasure marking is performed between the FFT 105 and the FEQ 106, the tone ordering element 119 and FEQ 118 may be removed such that the impulse noise detector 102 receives the CM signal directly from the FFT 116. Other locations of the erasure marking are possible in other embodiments.

Figure 9:
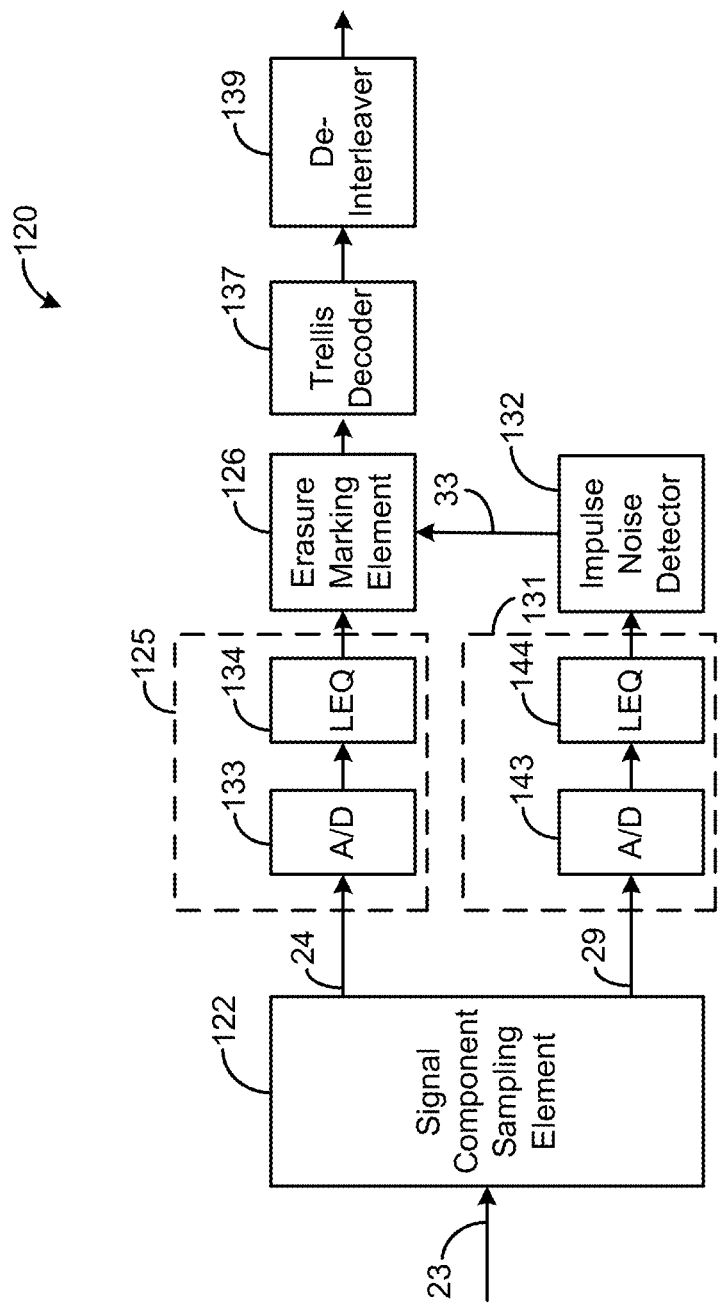
FIG. 9 is a block diagram depicting an exemplary embodiment of a receiver for a system using high bit-rate digital subscriber line (HDSL) or single-pair high-speed digital subscriber line (SHDSL) technology.

FIG. 9 depicts an exemplary embodiment of a receiver 120 that is configured to communicate according to HDSL, SHDSL, or other non-DMT technology. Like the receiver 90 of FIG. 8, the receiver 120 comprises a signal component sampling element 122, signal processing circuitry 125, an erasure marking element 126, signal processing circuitry 131, and an impulse noise detector 132. Note that the signal component sampling element 122, the erasure marking element 126, and the impulse noise detector 132 of FIG. 9 are configured identically to and operate the same as the signal component sampling element 22, the erasure marking element 26, and the impulse noise detector 32 of FIG. 2, respectively. The circuitry 125 comprises an A/D converter 133 and a linear equalizer (LEQ) 134, and the signal processing circuitry 131 similarly comprises an A/D converter 143 and a linear equalizer 144. The receiver 120 further comprises a trellis decoder 137 and a de-interleaver 139.

In the embodiment depicted by FIG. 9, the erasure marking element 126 is positioned in front of the trellis decoder 137 so that the sub-words received by the trellis decoder 137 are appropriately marked as erasures based on the impulse noise detector 132, as described above for the impulse noise detector 32 of FIG. 2. Thus, the sub-words corrupted by impulse noise detected by the impulse noise detector 132 are marked as erasures thereby enabling the trellis decoder 137 to correct more errors than would otherwise be possible without the erasure marking performed by the element 126.

In various embodiments described above, an impulse noise detector is described as detecting the presence of impulse noise when a CM signal received by the detector exceeds at least one threshold. Such threshold can be predefined (e.g., provisioned) and remain static. However, in one embodiment, the threshold is dynamically determined and can change from time-to-time as noise conditions change. As an example, the impulse noise detector 32 may be configured to calculate an average of the processed CM signal 34 and to define the threshold based on such calculated average. If desired, a predefined constant may be combined (e.g., multiplied) to the calculated average such that the threshold is established a desired amount above the calculated average. As the calculated average changes, the threshold is automatically updated to accommodate the changing line conditions.

It should be noted, however, that other techniques for establishing the threshold and/or sensing the presence of impulse noise in the common signal are possible. Further, various other changes and modification to the exemplary embodiments described herein would be apparent to a person of ordinary skill upon reading this disclosure.

Now, therefore, the following is claimed:

1. A receiver for compensating for impulse noise, comprising:
    a signal component sampling element configured to receive a data signal from a subscriber line and to separate the data signal into a common mode signal and a differential mode signal;
    an impulse noise detector configured to detect impulse noise in the common mode signal;
    an erasure marking element configured to mark a sub-word of the differential mode signal as an erasure based on a detection of impulse noise in the common mode signal by the impulse noise detector, wherein the impulse noise detector is configured to compare the common mode signal to a threshold and to detect an occurrence of impulse noise based on a comparison of the common mode signal to the threshold, and wherein the impulse noise detector is configured to adaptively update the threshold; and
    a decoder configured to decode the differential mode signal based on whether the sub-word is marked as an erasure by the erasure marking element.

2. A receiver for compensating for impulse noise, comprising:
    a signal component sampling element configured to receive a data signal from a subscriber line and to separate the data signal into a common mode signal and a differential mode signal;
    an impulse noise detector configured to detect impulse noise in the common mode signal;
    an erasure marking element configured to mark a sub-word of the differential mode signal as an erasure based on a detection of impulse noise in the common mode signal by the impulse noise detector, wherein the impulse noise detector is configured to compare the common mode signal to a threshold and to detect an occurrence of impulse noise based on a comparison of the common mode signal to the threshold, and wherein the impulse noise detector is configured to establish the threshold based on the common mode signal; and
    a decoder configured to decode the differential mode signal based on whether the sub-word is marked as an erasure by the erasure marking element.

3. The receiver of claim 2, further comprising:
    a differential mode path having signal processing circuitry configured to process the differential mode signal, wherein the signal component sampling element and the erasure marking element are coupled to the signal processing circuitry of the differential mode path; and
    a common mode path having signal processing circuitry configured to process the common mode signal, wherein the signal component sampling element and the impulse noise detector are coupled to the signal processing circuitry of the common path,
    wherein a delay of the differential mode path from the signal component sampling element to the erasure marking element is substantially equal to a delay of the common mode path from the signal component sampling element to the impulse noise detector.

4. The receiver of claim 2, further comprising a de-interleaver coupled to the erasure marking element and the decoder, the de-interleaver configured to receive the differential mode signal, de-interleave code words of the differential mode signal, and transmit the differential mode signal to the decoder.

5. The receiver of claim 2, wherein the decoder is a forward error correction (FEC) decoder.

6. The receiver of claim 2, wherein the decoder is a trellis decoder.

7. The receiver of claim 2, wherein the receiver comprises a trellis decoder, and wherein the erasure marking element is configured to mark the sub-word as the erasure prior to the reception of the sub-word by the trellis decoder.

8. The receiver of claim 2, wherein the receiver comprises a trellis decoder, and wherein the erasure marking element is configured to mark the sub-word as the erasure after receiving the sub-word from the trellis decoder.

9. The receiver of claim 2, wherein the impulse noise detector is configured to transmit to the erasure marking element a signal based on the impulse noise detected in the common mode signal, the signal indicating whether the sub-word is corrupted, and wherein the erasure marking element is configured to mark the sub-word as the erasure based on the signal.

10. A receiver for compensating for impulse noise, comprising:
    a signal component sampling element configured to receive a data signal from a subscriber line and to separate the data signal into a common mode signal and a differential mode signal;
    an impulse noise detector configured to detect impulse noise in the common mode signal;
    an erasure marking element configured to mark a sub-word of the differential mode signal as an erasure based on a detection of impulse noise in the common mode signal by the impulse noise detector; and
    a decoder configured to decode the differential mode signal based on whether the sub-word is marked as an erasure by the erasure marking element,
    wherein the impulse noise detector is configured to mark as an erasure a sub-word of a first tone of the differential mode signal based on a comparison of a first threshold to the common mode signal, wherein the impulse noise detector is configured to mark as an erasure a sub-word of a second tone of the differential mode signal based on a comparison of a second threshold to the common mode signal, and wherein a value of the first threshold is different than a value of the second threshold.

11. A method for compensating for impulse noise, comprising:
    receiving a data signal;
    separating the data signal into a common mode signal and a differential mode signal;
    detecting impulse noise in the common mode signal, wherein the detecting comprises comparing the common mode signal to a threshold;

marking a sub-word of the differential mode signal as an erasure based on the detecting;

decoding the differential mode signal based on the marking; and adaptively updating the threshold.

12. A method for compensating for impulse noise, comprising:

receiving a data signal;

separating the data signal into a common mode signal and a differential mode signal;

detecting impulse noise in the common mode signal, wherein the detecting comprises comparing the common mode signal to a threshold;

marking a sub-word of the differential mode signal as an erasure based on the detecting;

decoding the differential mode signal based on the marking; and establishing the threshold based on the common mode signal.

13. The method of claim 12, further comprising de-interleaving the code word subsequent to the marking.

14. A receiver for compensating for impulse noise, comprising:

a signal component sampling element configured to receive a data signal from a subscriber line and to separate the data signal into a common mode signal and a differential mode signal;

an impulse noise detector configured to detect impulse noise in the common mode signal;

an erasure marking element configured to mark a sub-word of the differential mode signal as an erasure based on a detection of impulse noise in the common mode signal by the impulse noise detector;

a decoder configured to decode the differential mode signal based on whether the sub-word is marked as an erasure by the erasure marking element;

a differential mode path having signal processing circuitry configured to process the differential mode signal, wherein the signal component sampling element and the erasure marking element are coupled to the signal processing circuitry of the differential mode path; and a common mode path having signal processing circuitry configured to process the common mode signal, wherein the signal component sampling element and the impulse noise detector are coupled to the signal processing circuitry of the common path, wherein a delay of the differential mode path from the signal component sampling element to the erasure marking element is substantially equal to a delay of the common mode path from the signal component sampling element to the impulse noise detector, wherein the receiver comprises a trellis decoder, and wherein the erasure marking element is configured to mark the sub-word as the erasure after receiving the sub-word from the trellis decoder.

15. A method for compensating for impulse noise, comprising:

receiving a data signal;

separating the data signal into a common mode signal and a differential mode signal;

detecting impulse noise in the common mode signal;

marking a sub-word of the differential mode signal as an erasure based on the detecting; and decoding the differential mode signal based on the marking, wherein the sub-word corresponds to a first tone of the differential mode signal, wherein the detecting comprises comparing a first threshold to the sub-word corresponding to the first tone and comparing a second threshold to a sub-word corresponding to a second tone of the differential mode signal, wherein the marking is based on the comparing the first threshold, wherein the second threshold has a value different than a value of the first threshold, and wherein the method further comprises marking the sub-word corresponding to the second tone as an erasure based on the comparing the second threshold.

* * * * *